United States Patent
Davis et al.

(10) Patent No.: US 8,936,300 B2
(45) Date of Patent: Jan. 20, 2015

(54) TILTABLE CAB ASSEMBLY

(75) Inventors: Curtis Davis, Millbrook, AL (US); Gary Gibson, Greenville, AL (US)

(73) Assignee: Progress Rail Services Corp, Albertville, AL (US)

(*) Notice: Subject to any disclaimer, the term of this patent is extended or adjusted under 35 U.S.C. 154(b) by 135 days.

(21) Appl. No.: 13/485,242

(22) Filed: May 31, 2012

(65) Prior Publication Data

US 2013/0319285 A1 Dec. 5, 2013

(51) Int. Cl.
*B62D 33/07* (2006.01)
*B62D 33/067* (2006.01)
*B61C 17/04* (2006.01)

(52) U.S. Cl.
CPC .......... *B62D 33/07* (2013.01); *B61C 17/04* (2013.01)
USPC .......... 296/190.06; 105/456; 180/89.14; 296/190.04

(58) Field of Classification Search
CPC ...... B61C 17/04; E01B 27/02; B62D 33/067; B62D 33/07
USPC .......... 104/2, 7.3; 105/342, 456; 180/89.13–89.15; 296/190.04–190.06
See application file for complete search history.

(56) References Cited

U.S. PATENT DOCUMENTS

| | | | | |
|---|---|---|---|---|
| 3,182,605 A | * | 5/1965 | Brasher | 105/342 |
| 3,578,377 A | * | 5/1971 | Babbitt et al. | 296/102 |
| 3,658,369 A | * | 4/1972 | Barnes | 403/316 |
| 3,841,693 A | * | 10/1974 | Reynolds et al. | 180/89.14 |
| 3,985,194 A | * | 10/1976 | Knutson | 180/89.15 |
| 4,282,663 A | * | 8/1981 | Theurer | 37/104 |
| 4,411,332 A | * | 10/1983 | Eichelsheim | 180/89.14 |
| 5,060,742 A | * | 10/1991 | Kuhlmann et al. | 180/89.14 |
| 5,493,795 A | * | 2/1996 | Bail | 37/104 |
| 6,502,655 B2 | * | 1/2003 | Peddycord et al. | 180/89.14 |
| 6,883,436 B2 | * | 4/2005 | Fuerst | 104/7.3 |
| 7,472,946 B2 | * | 1/2009 | Hollenbeck et al. | 296/190.04 |
| 7,673,931 B2 | * | 3/2010 | Takano et al. | 296/190.01 |
| 8,469,130 B2 | * | 6/2013 | Werner et al. | 180/89.14 |
| 2012/0211294 A1 | * | 8/2012 | Werner et al. | 180/89.14 |
| 2013/0221704 A1 | * | 8/2013 | Kim | 296/190.04 |

FOREIGN PATENT DOCUMENTS

| | | | |
|---|---|---|---|
| DE | 444737 | 5/1927 | |
| DE | 9303516 | 7/1993 | |
| DE | 19621962 A1 | 10/1996 | |
| FR | 85090 | 6/1965 | |
| JP | 06144793 A | * 5/1994 | B66F 9/075 |

OTHER PUBLICATIONS

MOW Equipment Manufacturing: Ballast Regulator 4600, Kershaw, a Division of Progress Rail Services (received Mar. 2, 2012).

* cited by examiner

*Primary Examiner* — Zachary Kuhfuss
(74) *Attorney, Agent, or Firm* — Finnegan, Henderson, Farabow, Garrett & Dunner LLP

(57) ABSTRACT

A cab assembly is disclosed for use with a machine having a frame. The cab assembly may include an operator cab with a first side and a second side, a plurality of cab mounts connecting the operator cab to the frame, and a hydraulic cylinder connected at one end to the operator cab and at an opposing end to the frame. The plurality of cab mounts may be selectively disconnected from the operator cab to allow the hydraulic cylinder to tilt the operator cab toward the first side or the second side of the operator cab.

17 Claims, 5 Drawing Sheets

TILTABLE CAB ASSEMBLY

TECHNICAL FIELD

The present disclosure relates generally to a cab assembly and, more particularly, to a cab assembly capable of tilting in two directions.

BACKGROUND

A railway track requires routine maintenance to remain in good working order. Maintenance of the railway track is commonly performed by a variety of specialized maintenance-of-way machines that operate while traveling along the length of the railway track. For example, maintenance-of-way operations performed by machines traveling along the length of the railway track may include distributing track ballast that is deposited between railway ties laid perpendicularly to the railway track, packing the track ballast under the railway track, leveling the track ballast height, shaping the track ballast shoulder, and sweeping the track ballast.

One example of such a maintenance-of-way machine is a ballast regulator. The ballast regulator typically includes an operator cab that houses the controls necessary to operate the machine. The operator cab is supported by a frame that also provides a mounting for an engine, axles, and wheel sets. Located beneath the operator cab is a housing that contains serviceable hydraulics of the ballast regulator. For example, the housing contains a power transmission system, pumps, valves, filters, and fluid. Access to the serviceable hydraulics is regularly necessary to ensure good working order of the ballast regulator. Because the operator cab sits atop the serviceable hydraulics, it can be difficult for an operator to obtain access to the hydraulics area to perform maintenance tasks.

Obtaining access to the serviceable hydraulics of the ballast regulator is generally accomplished by tilting the operator cab at an angle to the frame to expose the serviceable hydraulics. In this position, the operator cab takes up a significant amount of space at the side of the machine toward which the operator cab is tilting. An example of a railway vehicle equipped with a tiltable operator cab is disclosed in German Patent Application No. 19621962A1 to Jacksädt et al. ("Jacksädt") that published on Oct. 24, 1996.

Although a tilting cab provides adequate access to the space underneath the cab, it may still be less than optimal. This is because conventional cabs tilt in only a single direction and/or at an undesirable angle. Because railway tracks are often positioned parallel to each other, the space at the side of the railway vehicle toward which the driver cab tilts may not always be available. For example, tilting of the driver cab in a particular direction or at a particular angle may be obstructed by other railway vehicles sitting on an adjacent railway track.

The cab assembly of the present disclosure solves one or more of the problems set forth above and/or other problems in the art.

SUMMARY

In one aspect, the present disclosure is related to a cab assembly for use with a machine having a frame. The cab assembly may include an operator cab with a first side and a second side, a plurality of cab mounts connecting the operator cab to the frame, and a hydraulic cylinder connected at one end to the operator cab and at an opposing end to the frame. The plurality of cab mounts may be selectively disconnected from the operator cab to allow the hydraulic cylinder to tilt the operator cab toward the first side or the second side of the operator cab.

In another aspect, the present disclosure may be related to a cab assembly. The cab assembly may include an operator cab, a frame, a plurality of cab mounts connecting the operator cab to the frame, a hydraulic cylinder connected at one end to the operator cab and an opposing end to the frame, and a lock bar selectively connectable between the frame and the plurality of cab mounts to secure the operator cab in a tilted position. The plurality of cab mounts may be selectively disconnected from the operator cab to allow the hydraulic cylinder to tilt the operator cab relative to the frame.

DETAILED DESCRIPTION

Figure 1:
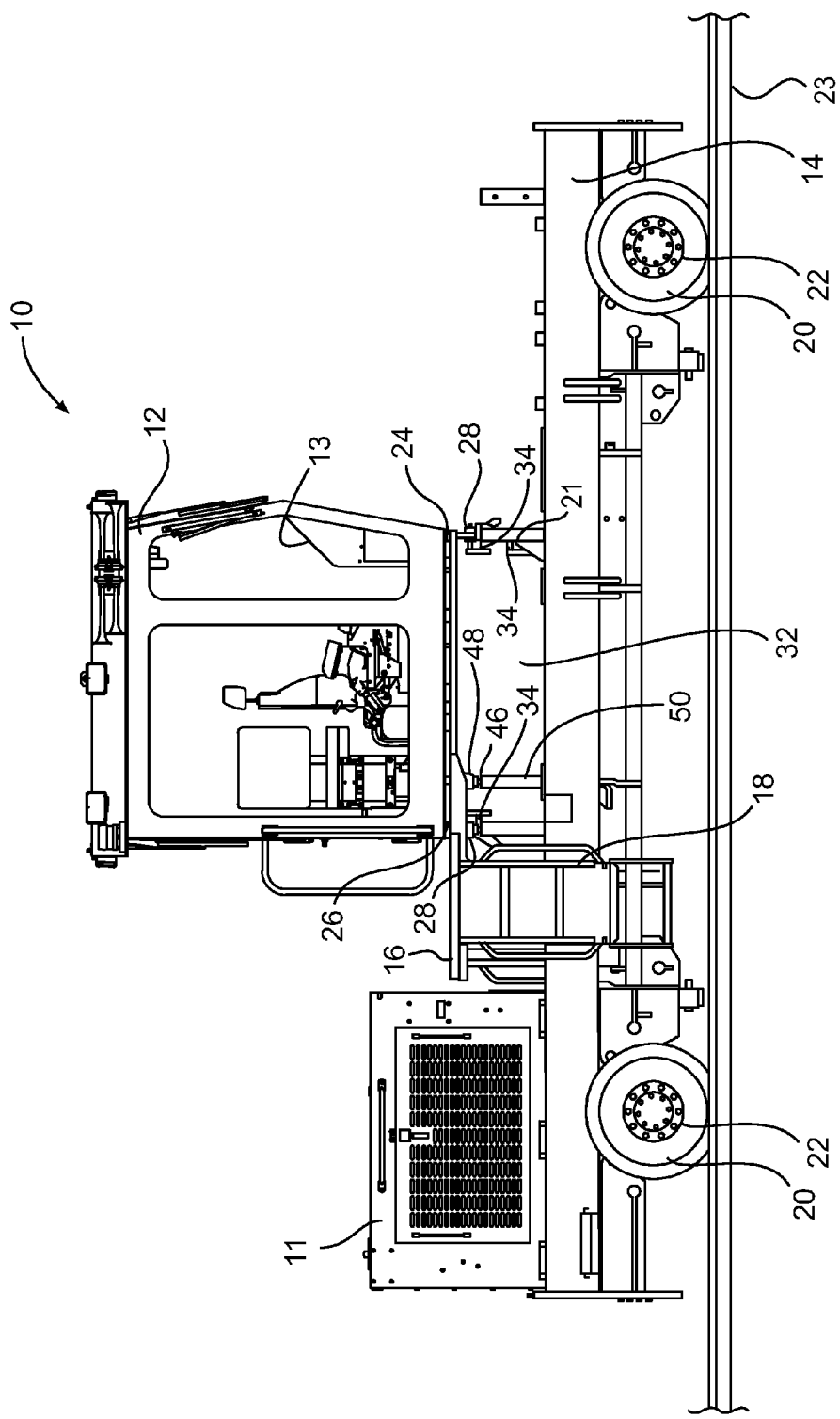
FIG. 1 is a side view illustration of an exemplary disclosed machine.

FIG. 1 illustrates an exemplary embodiment of a machine 10. Machine 10 may be a mobile machine that performs some type of operation associated with railway maintenance, mining, construction, farming, or another similar industry. For example, machine 10 may be a ballast regulator, a tree trimmer, a wheel loader, a haul truck, a backhoe, an excavator, or a motor grader. Machine 10, in this embodiment, is a ballast regulator. Machine 10 may be configured to engage a railway track 23.

Machine 10 may include an operator cab 12 that houses the controls necessary to operate machine 10. Operator cab 12 may include operator input devices 13 that receive input from the operator indicative of desired machine maneuvering, such as machine speed, braking, and/or tool control. Operator input devices 13 may include single- or multi-axis joysticks, a pedal, or other known input devices located proximate to an operator's seat. Operator input devices 13 may initiate movement of machine 10, such as travel and/or tool movement. For example, as the operator moves operator input devices 13, the operator may affect a corresponding machine movement in a desired direction, with a desired speed, and/or with a desired force. A walkway 16 and a staircase 18 may be provided adjacent to operator cab 12 to permit the operator to ascend and descend operator cab 12.

Operator cab 12 may be supported by a frame 14 that provides a mounting for an engine 11. Frame 14 may include a plurality of wheels 20 connected by a plurality of axles 22. Two wheels 20 may be rigidly connected at the opposing ends of each axle 22 such that wheels 20 and axles 22 all rotate together. Wheels 20 may engage railway track 23 and be driven to rotate by engine 11. Operator cab 12 may be located opposite wheels 20 relative to frame 14. Beneath operator cab 12 (e.g., between operator cab 12 and frame 14) may be a hydraulics area 32 that contains serviceable hydraulics of machine 10. For example, hydraulics area 32 may contain a power transmission system, pumps, valves, filters, and fluid.

Operator cab 12 may be connected at a front end 24 and a back end 26 to frame 14 via a plurality of cab mounts 28. Cab mounts 28 may allow operator cab 12 to be removably connected or pivotally linked to frame 14 to permit access to hydraulics area 32, which is described in greater detail below. In the disclosed embodiment of the present disclosure, cab mounts 28 may be positioned at the general corners of operator cab 12.

Figure 2:
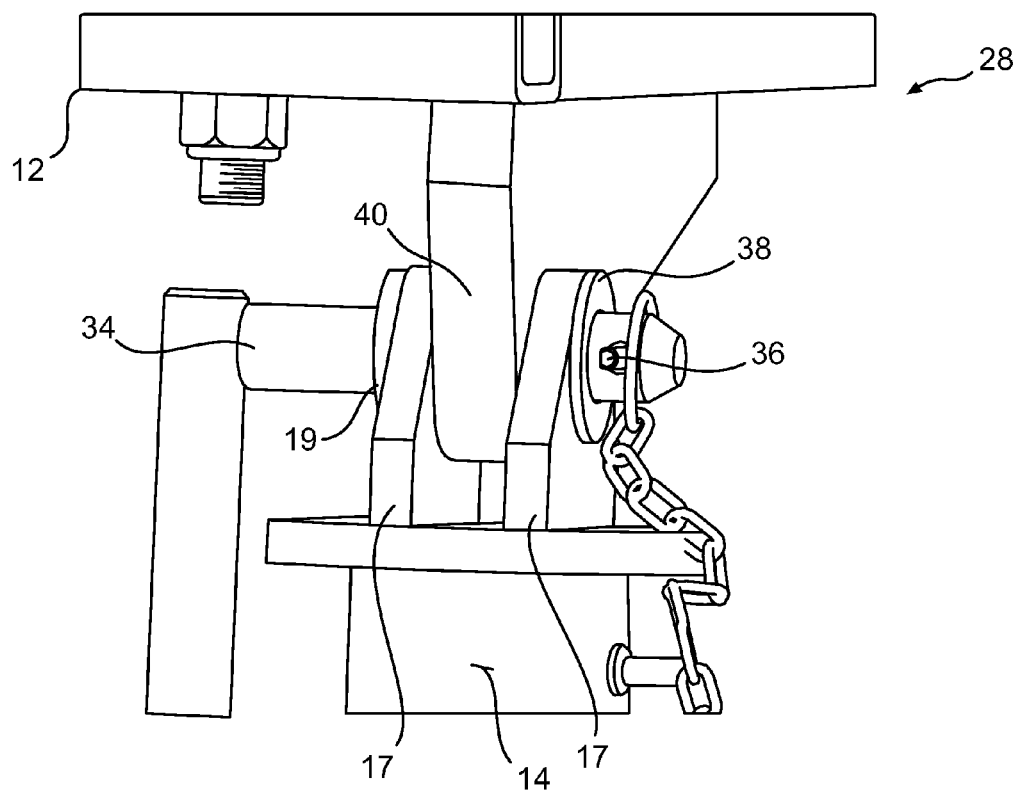
FIG. 2 is an enlarged perspective view illustration of an exemplary disclosed pin assembly that may be used in conjunction with the machine of FIG. 1.

As illustrated in FIG. 2, each cab mount 28 may be an assembly of a retaining pin 34, a linchpin 36, and a washer 38 that connect one or more ears 40 of operator cab 12 to one or more tabs 17 of frame 14. In the disclosed embodiment, one ear 40 is located at a center of cab mount 28 and two tabs 17 are located at sides of cab mount 28 in a spaced-apart configuration to receive ear 40. Ear 40 may be welded to operator cab 12 and tabs 17 may be welded to frame 14. Ear 40 and tabs 17 may include aligned holes 19 that receive retaining pin 34. Retaining pin 34 may include a protrusion at one end that prevents retaining pin 34 from passing completely through holes 19 and serves as a handle to remove retaining pin 34. Retaining pin 34 may be further secured by washer 38 and linchpin 36 at an opposite side of cab mount 28. If desired, linchpin 36 may be chained to operator cab 12 or frame 14 to prevent loss after being removed. In this configuration, when retaining pins 34 at one side of operator cab 12 are removed, operator cab 12 may be allowed to pivot about the remaining retaining pins 34 relative to frame 14. Operator cab 12 may be completely removed from frame 14 when retaining pins 34 are removed from all cab mounts 28.

Figure 3:
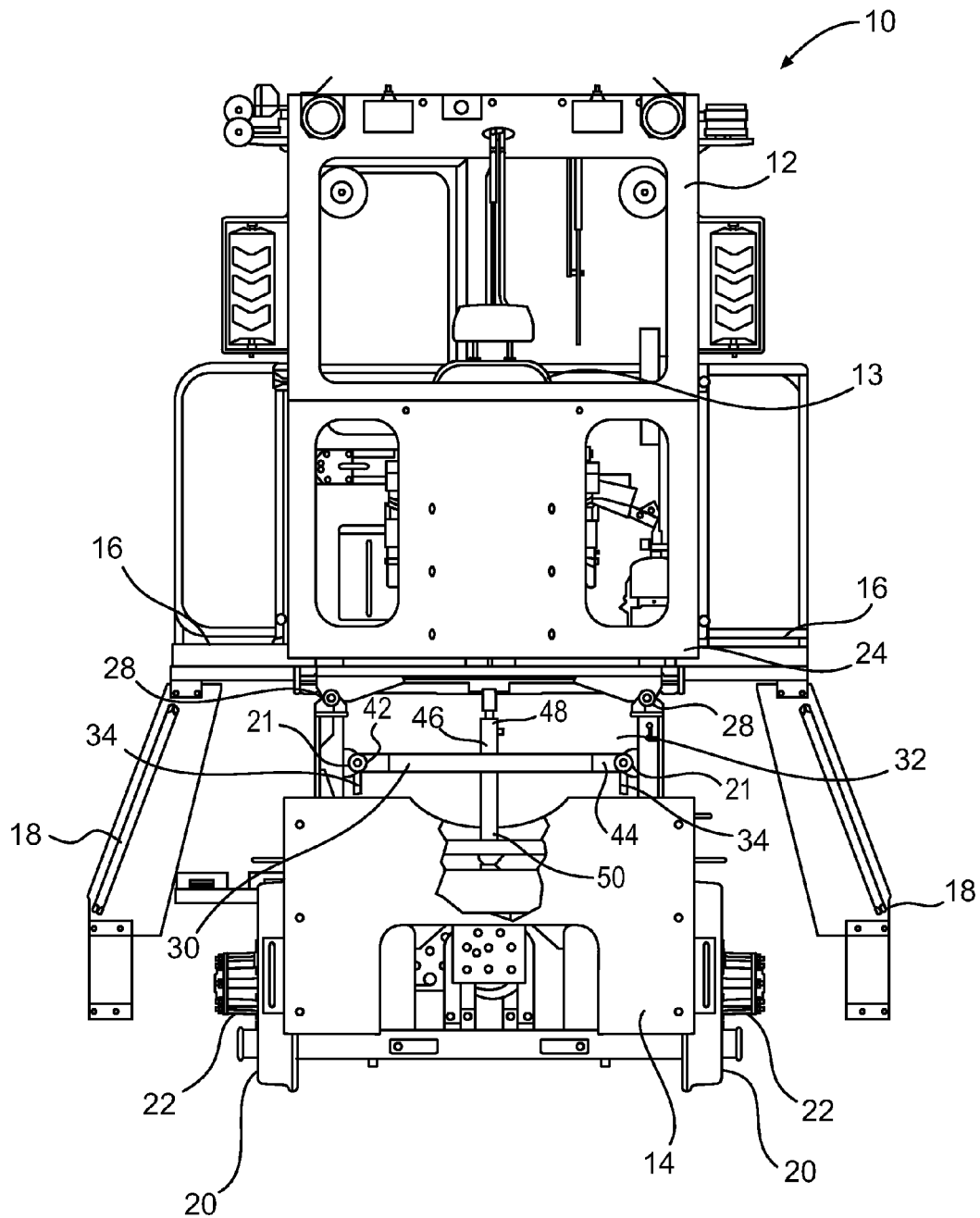
FIG. 3 is a front view illustration of the machine of FIG. 1.

As illustrated in FIG. 3, a hydraulic cylinder 46 may be connected between operator cab 12 and frame 14 at a general transverse and lengthwise center of operator cab 12. Hydraulic cylinder 46 may alternatively be positioned in any number of other areas relative to operator cab 12, if desired. It should be appreciated, however, that as hydraulic cylinder 46 is positioned proximate to a general center in a transverse and lengthwise direction relative to operator cab 12, operation of hydraulic cylinder 46 may be more stable.

In the disclosed embodiment of the present disclosure, hydraulic cylinder 46 may be connected at a rod end 48 to a lower surface of operator cab 12 and connected at a head end 50 to an upper surface of frame 14. This configuration may permit a desired amount of force to be transferred from hydraulic cylinder 46 to operator cab 12. It is contemplated that a reverse configuration may alternatively be utilized, if desired.

Hydraulic cylinder 46 may be of conventional design. For example, hydraulic cylinder 46 may include a piston (not shown) that moves within a tube. The tube may be sealed at rod end 48 and head end 50 by caps (not shown), and connected to a piston rod that exits the tube at rod end 48 through a hole in the associated cap. Hydraulic cylinder 46 may be controlled to extend or retract via operator input devices 13 located within operator cab 12, or elsewhere on machine 10.

An extension of hydraulic cylinder 46 may function to pivot operator cab 12 about frame 14 to a tilted position such that the operator is permitted access to hydraulics area 32. For example, as hydraulic cylinder 46 extends upward, operator cab 12 may gradually tilt about the remaining retaining pins 34 to an angular orientation between about 35-45° relative to frame 14. A retraction of hydraulic cylinder 46 may function to restore operator cab 12 to a position in which operator cab 12 is generally parallel to frame 14.

As also shown in FIG. 3, a lock bar 30 may be stowed between opposing cab mounts 28 at front end 24 of operator cab 12. Lock bar 30 may be located generally below cab mounts 28 and connected at opposing ends of frame 14. This location of lock bar 30 may facilitate its convenient employment in a support position, which is described in greater detail below. The stowed location of lock bar 30 may be modified, if desired. For example, rather than being placed between opposing cab mounts 28 at front end 24 of operator cab 12, lock bar 30 may be placed between opposing cab mounts 28 at back end 26 of operator cab 12 or elsewhere on machine 10.

Although lock bar 30 may alternatively be attached to other areas of machine 10, it should be appreciated that the depicted location of lock bar 30 may provide particular benefits. In particular, this configuration may facilitate a convenient employment of lock bar 30 by reducing movements required to secure operator cab 12 in a tilted position. In addition to convenience, this configuration may also reduce the time needed to secure operator cab 12.

Figure 4:
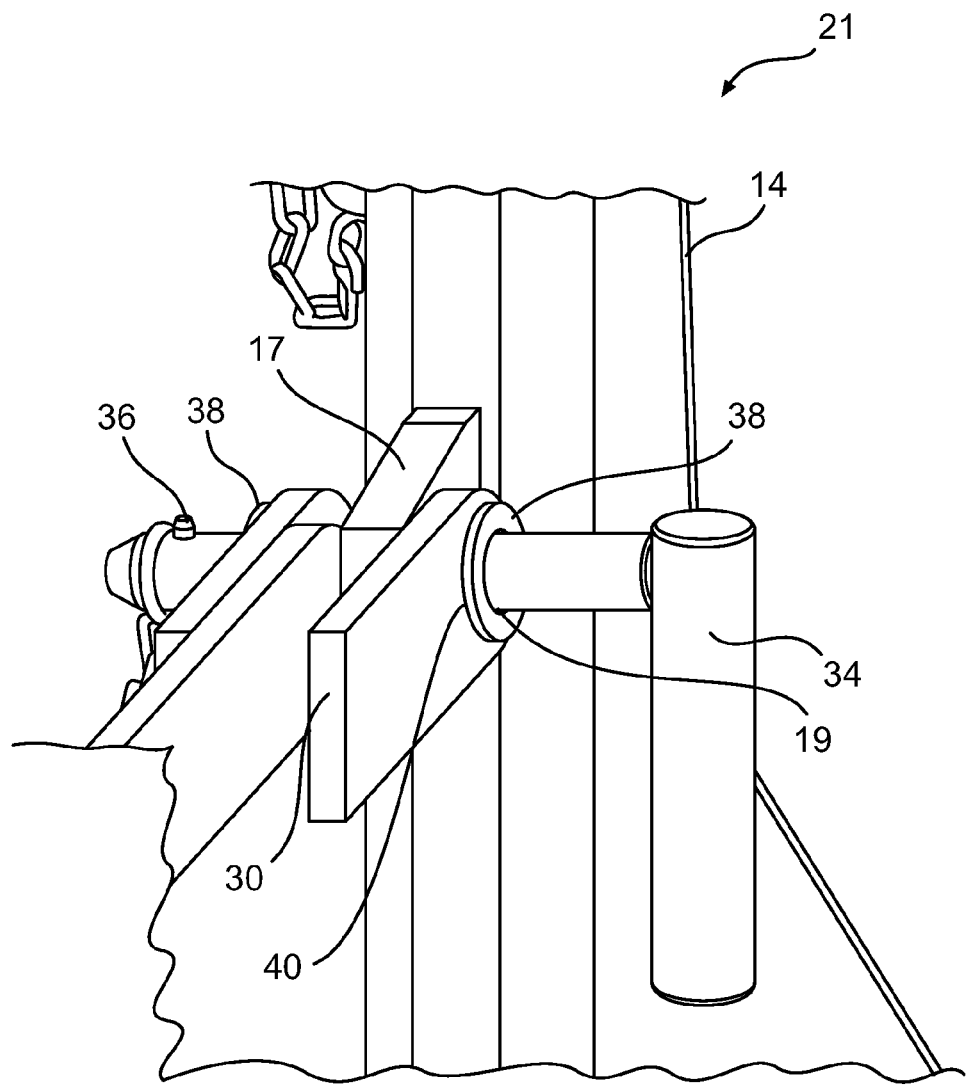
FIG. 4 is an enlarged perspective view illustration of an exemplary disclosed lock bar assembly that may be used in conjunction with the machine of FIGS. 1 and 3.

Lock bar 30 may be attached at first and second ends 42, 44 to frame 14 via a lock bar mount 21. As shown in FIG. 4, each lock bar mount 21 may be an assembly of a retaining pin 34, a linchpin 36, and a washer 38 that connect a tab 17 of lock bar mount 21 to ears 40 of frame 14. Ears 40 may be welded to frame 14 in a spaced-apart configuration to receive tab 17 of lock bar 30. Ears 40 and tab 17 may include aligned holes 19 that receive retaining pin 34. Retaining pin 34 may include a protrusion at one end that prevents retaining pin 34 from passing completely through holes 19 and serves as a handle to remove retaining pin 34. Retaining pin 34 may engage one ear 40 on one side of lock bar mount 21 and be further secured by a washer 38 and linchpin 36 on an opposite side. In this configuration, lock bar 30 may be removably connected or pivotally linked to frame 14 at both ends.

Lock bar 30 may be selectively moved from the stowed position to a support position. In the support position, lock bar 30 may function to lock operator cab 12 in a tilted orientation after operator cab 12 has been pivoted about frame 14, which is described in greater detail below. Lock bar 30 may generally remain in the stowed position while machine 10 carries out its conventional maintenance operation. In the disclosed embodiment of the present disclosure, in which machine 10 corresponds to a ballast regulator, such operations may include, for example, distributing track ballast deposited between railway ties laid perpendicularly to railway track 23. As the ballast regulator travels along railway track 23, the ballast regulator may also operate tools, such as an attached broom, to level the track ballast height, shape the track ballast shoulder, and sweep the track ballast.

Figure 6:
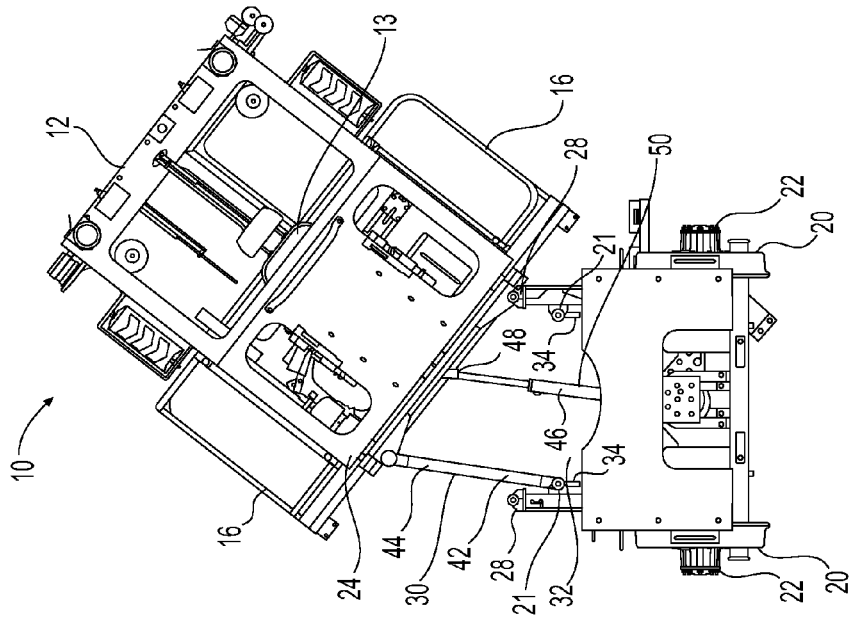
FIG. 6 is a front view illustration of the cab assembly of FIG. 5, shown in a second tilting position.
Figure 5:
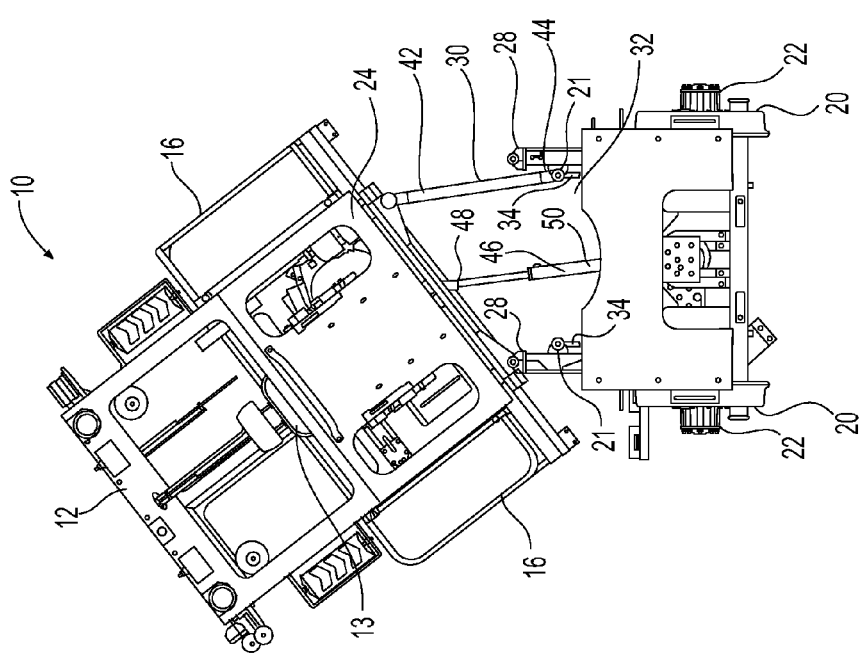
FIG. 5 is a front view illustration of a cab assembly that may be used in conjunction with the machine of FIGS. 1 and 3, shown in a first tilting position.

As illustrated in FIGS. 5 and 6, operator cab 12 may be tilted to an angle between about 35-45° relative to frame 14. When operator cab 12 has reached this angular orientation, lock bar 30 may be manually employed to inhibit operator cab 12 from further movement.

INDUSTRIAL APPLICABILITY

The disclosed cab assembly may effectively permit access to an area beneath an operator cab by providing for a selective tilting of the cab assembly in two directions. This dual-direction tilt capability may facilitate maintenance operations when nearby objects obstruct one side of a machine. This application may be particularly salient in railway maintenance operations in which the machine is operating on a railway track and other railway vehicles located on adjacent tracks preclude pivoting in a particular direction. Tilting operations of operator cab 12 will now be described. For the purposes of this disclosure, right and left is defined with respect to the operator sitting in operator cab 12.

To pivot operator cab 12, the operator may disengage both retaining pins 34 associated with ears 40 of cab mounts 28 at one side of machine 10. For example, to pivot operator cab 12 toward the right, the operator may disengage both retaining pins 34 associated with ears 40 of cab mounts 28 at front and back ends 24, 26 on the left side of operator cab 12. Similarly, to pivot operator cab 12 toward the left, the operator may disengage both retaining pins 34 associated with ears 40 of cab mounts 28 at front and back ends 24, 26 on the right side of operator cab 12. The operator may then activate hydraulic cylinder 46.

Upon activation of hydraulic cylinder 46, pressurized hydraulic oil may be pumped to hydraulic cylinder 46 to push the piston toward rod end 48 and thereby extend the piston rod. As the piston rod extends, operator cab 12 may be caused to pivot about retaining pins 34 that are still engaged at one side of operator cab 12. In this manner, hydraulic cylinder 46 may convert hydraulic energy into linear mechanical energy that pivots operator cab 12 about frame 14.

To employ lock bar 30 in the pivoting of operator cab 12, an operator may disengage retaining pins 34 associated with lock bar 30 at the side toward which operator cab 12 should pivot. For example, to pivot operator cab 12 toward the right, an operator may disengage retaining pins 34 associated at first end 42 of lock bar 30. Similarly, to pivot operator cab 12 toward the left, an operator may disengage retaining pins 34 at second end 44 of lock bar 30. Tab 17 at this end of lock bar 30 may be locked to the front right ears 40 of cab mount 28 via retaining pins 34.

The angular orientation of operator cab 12 in its pivoted position, between about 35-45° relative to frame 14, may facilitate desired access to hydraulics area 32. At an angular orientation between about 35-45°, the operator may be provided sufficient space to perform maintenance operations, while conserving the amount of side space required to perform the pivoting operation.

The employment of lock bar 30, as described in detail above, may provide further advantages to the cab assembly of the present disclosure. When employed, lock bar 30 may help secure operator cab 12 in the tilted position. As a result, the operator performing maintenance operations in hydraulics area 32 may be protected from inadvertent movement of operator cab 12.

It will be apparent to those skilled in the art that various modifications and variations can be made to the disclosed cab assembly without departing from the scope of the disclosure. Other embodiments of the cab assembly will be apparent to those skilled in the art from consideration of the specification and practice of the cab assembly disclosed herein. It is intended that the specification and examples be considered as exemplary only, with a true scope of the disclosure being indicated by the following claims and their equivalents.

What is claimed is:

1. A cab assembly for a machine having a frame, comprising:
    an operator cab with a first side and a second side;
    a plurality of cab mounts connecting the operator cab to the frame;
    a hydraulic cylinder connected at one end to the operator cab and at an opposing end to the frame, wherein the plurality of cab mounts may be selectively disconnected from the operator cab to allow the hydraulic cylinder to tilt the operator cab toward one of the first side and the second side of the operator cab; and
    a lock bar configured to secure the operator cab in a tilted position, wherein the lock bar includes a stowed position in which opposing ends of the lock bar are both secured to the frame.

2. The cab assembly of claim 1, wherein the plurality of cab mounts includes four cab mounts positioned at corners of the operator cab.

3. The cab assembly of claim 1, further including a plurality of retaining pins configured to removably connect the operator cab to the frame at the plurality of cab mounts.

4. The cab assembly of claim 3, wherein each of the plurality of retaining pins includes a protrusion at one end.

5. The cab assembly of claim 3, further including a plurality of linchpins configured to secure the retaining pins at the plurality of cab mounts.

6. The cab assembly of claim 1, wherein the hydraulic cylinder is generally positioned at a lateral and lengthwise center of the operating cab.

7. The cab assembly of claim 1, wherein an extension of the hydraulic cylinder tilts the operator cab to an angle of about 35-45° relative to the frame.

8. The cab assembly of claim 1, wherein opposing ends of the lock bar are selectively connectable one at a time to the plurality of cab mounts to secure the cab assembly.

9. A cab assembly, comprising:
    an operator cab;
    a frame;
    a plurality of cab mounts connecting the operator cab to the frame;
    a hydraulic cylinder connected at one end to the operator cab and an opposing end to the frame, wherein the plurality of cab mounts may be selectively disconnected from the operator cab to allow the hydraulic cylinder to tilt the operator cab relative to the frame toward one of the first side and the second side of the operator cab; and
    a lock bar selectively connectable between the frame and the plurality of cab mounts to secure the operator cab in a tilted position, wherein the lock bar includes a stowed position in which opposing ends of the lock bar are both secured to the frame.

10. The cab assembly of claim 9, wherein the plurality of cab mounts includes four cab mounts positioned at corners of the operator cab.

11. The cab assembly of claim 9, further including a plurality of retaining pins configured to removably connect the operator cab to the frame at the plurality of cab mounts.

12. The cab assembly of claim 11, wherein each of the plurality of retaining pins includes a protrusion at one end.

13. The cab assembly of claim 11, further including a plurality of linchpins configured to secure the retaining pins at the plurality of cab mounts.

14. The cab assembly of claim 9, wherein the hydraulic cylinder is generally positioned at a late al and lengthwise center of the operating cab.

15. The cab assembly of claim 9, wherein an extension of the hydraulic cylinder tilts the operator cab to an angle of about 35-45° relative to the frame.

16. The cab assembly of claim 9, wherein opposing ends of the lock bar are selectively connectable one at a time to the plurality of cab mounts to secure the cab assembly.

17. A ballast regulator, comprising:
    a frame;
    a plurality of wheels configured to support the frame on a railway track;
    an operator cab with a first side and a second side;
    a plurality of cab mounts connecting the operator cab to the frame;

a hydraulic cylinder connected at one end to the operator cab and at an opposing end to the frame, wherein the plurality of cab mounts may be selectively disconnected from the operator cab to allow the hydraulic cylinder to tilt the operator cab toward one of the first side and the second side of the operator cab; and a lock bar selectively connectable between the frame and the plurality of cab mounts to secure the operator cab in a tilted position, wherein the lock bar includes a stowed position in which opposing ends of the lock bar are both secured to the frame.

* * * * *

UNITED STATES PATENT AND TRADEMARK OFFICE
CERTIFICATE OF CORRECTION

PATENT NO. : 8,936,300 B2
APPLICATION NO. : 13/485242
DATED : January 20, 2015
INVENTOR(S) : Davis et al.

Page 1 of 1

It is certified that error appears in the above-identified patent and that said Letters Patent is hereby corrected as shown below:

ON THE TITLE PAGE

First Page, Column 1, Item 73 (Assignee), line 1, delete "Corp," and insert -- Corporation --.

IN THE CLAIMS

Column 6, line 53, in Claim 14, delete "late al" and insert -- lateral --.

Signed and Sealed this
Seventeenth Day of November, 2015

Michelle K. Lee
*Director of the United States Patent and Trademark Office*